INVENTORS
George E. Boller and
Richard J. Renk.
By Mann, Brown & McWilliams.
Attys.

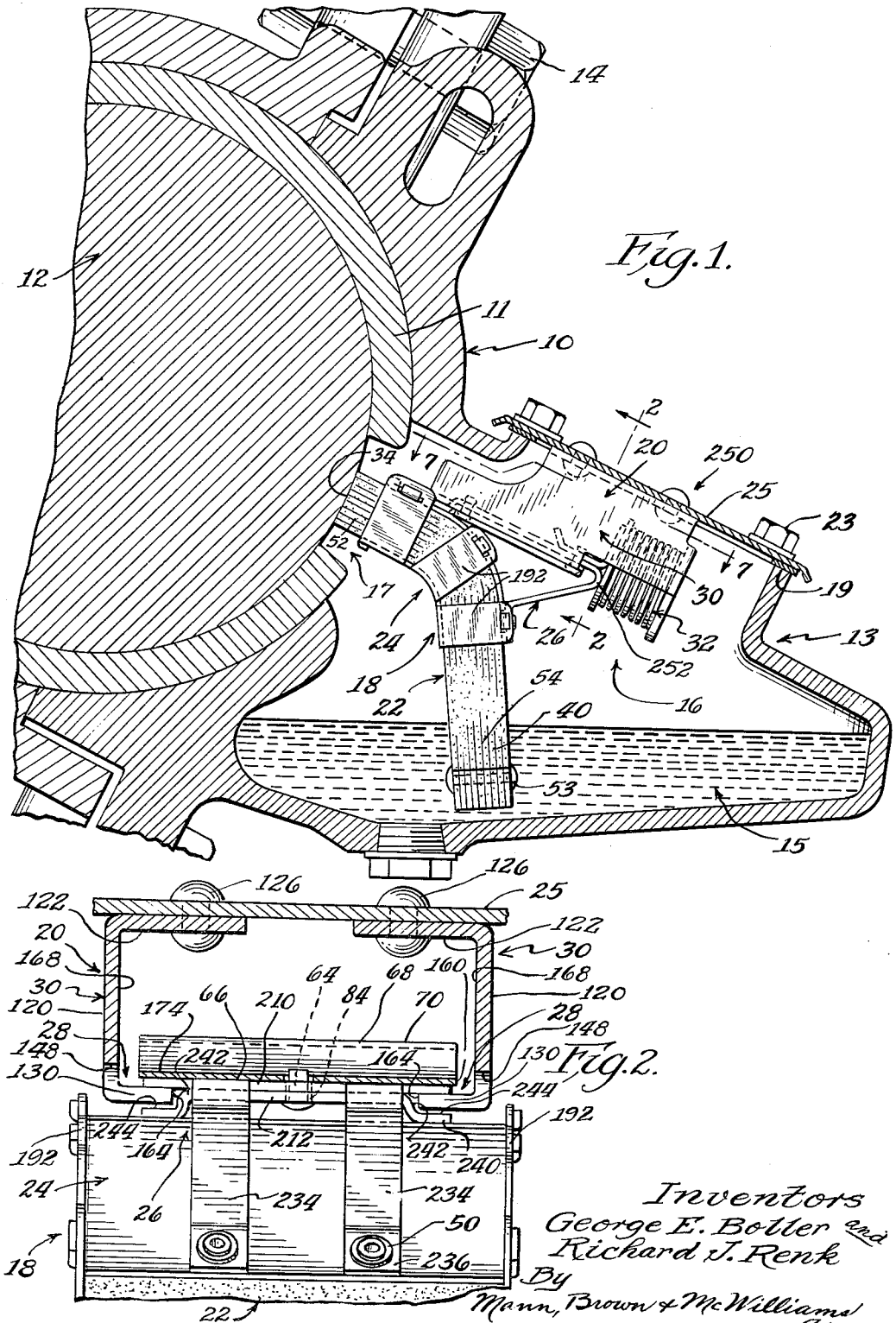

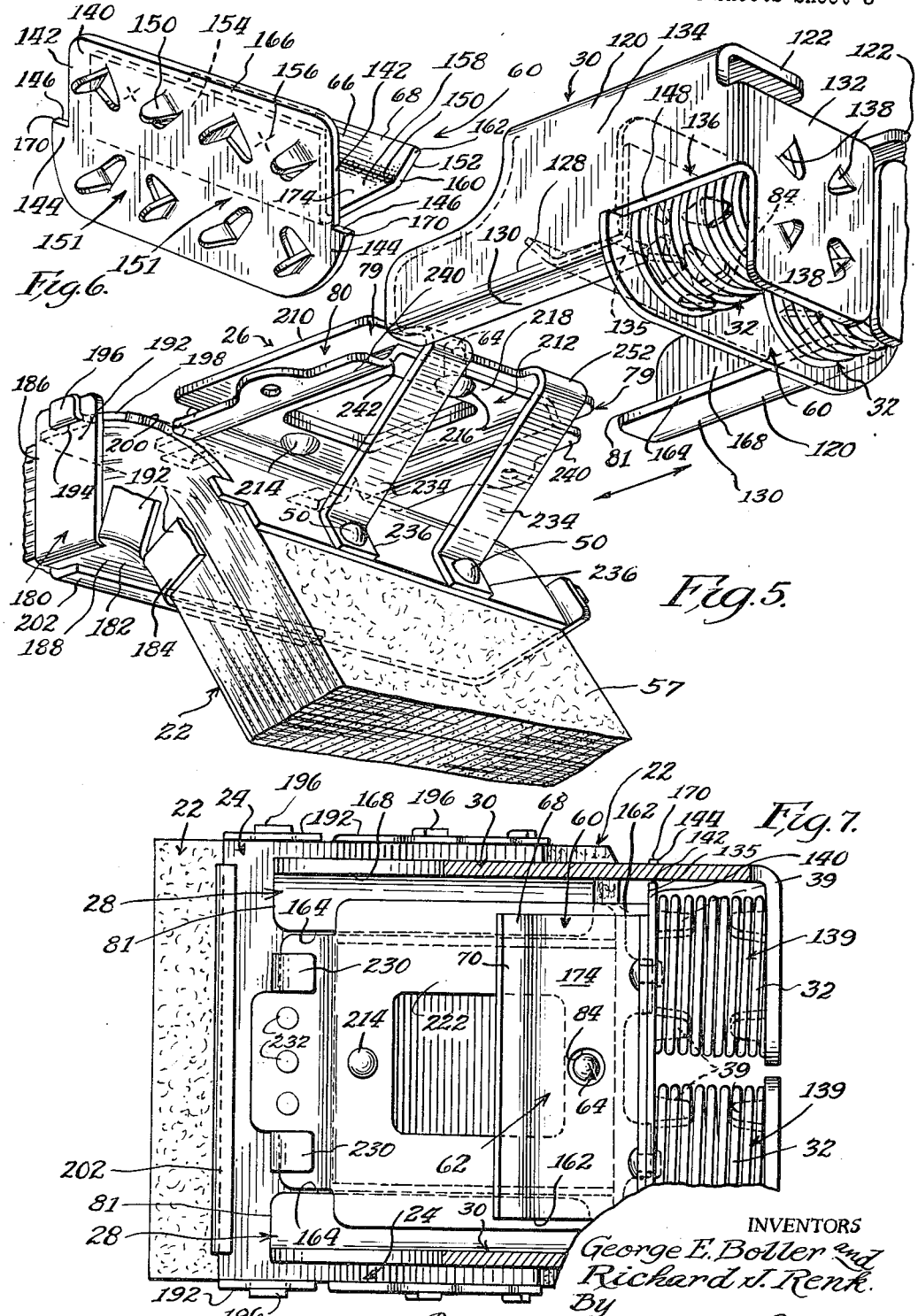

Inventors
George E. Boller and
Richard J. Renk
By Mann, Brown and McWilliams
Attys.

United States Patent Office 3,210,138
Patented Oct. 5, 1965

3,210,138
LUBRICATOR FOR TRACTION MOTOR
SUSPENSION BEARINGS
George E. Boller and Richard J. Renk, Winona, Minn.,
assignors to Gladys D. Miller, Winona, Minn.
Filed Sept. 26, 1962, Ser. No. 226,202
17 Claims. (Cl. 308—132)

Our invention relates to a lubricator for traction motor suspension bearings, and more particularly, to lubricator units adapted for use in the axle cap of such bearings for the purpose of conducting lubricant from the axle cap lubricant reservoir to the journal.

The lubricator units of the type to which our invention relates are composed of a lubricating wick suspended by a carrier assembly. The wick lifts, by capillary action, lubricant from the oil reservoir of the axle cap and applies it to the axle journal through a window opening formed in the bearing assembly at one side thereof.

Lubricating wicks for lubricators of this type have in the past been in the form of a felt body provided with a thickened upper portion formed with an arcuate surface that is complementary to that of the journal which it engages, and a depending projection which extends from the thickened portion into the oil reservoir of the axle cap to supply the oil to the thickened portion (see, for instance, Harkenrider Patent 2,708,611, granted May 17, 1955). Such lubricating wicks or bodies are conventionally mounted in or are supported by a holder that is suspended in the axle cap by a carrier assembly which includes springs or the like to bias the wick or lubricating body against the journal.

These lubricating bodies are customarily formed from felt material, and since it is commercially difficult to make a felt wick having sufficient area to cover the surface of the journal exposed by the window opening of the bearing, the lubricator body has been customarily supplied in the form of a group of felt bodies secured together, for instance, in the manner suggested in the above mentioned Harkenrider patent as well as Harkenrider Patent 2,640,741, granted June 2, 1953. Experience has shown that the application of lubricant to the journal affected by these composite lubricating bodies is not as uniform longitudinally of the journal as it should be because of the joints between the felt bodies making up the composite body, where capillary action is at a minimum. Consequently, the composite lubricating bodies had to have an applicator surface that was of sufficient dimension transversely of the journal to insure acceptable distribution of the oil transmitted to the journal.

A principal object of this invention is to provide a lubricator unit employing a simplified one-piece lubricating wick that may be of minimum dimension transversely of the journal and thereby permits reduction of the size of the bearing assembly window opening while still insuring maximum application of lubricant over the widths of the window opening.

A further principal object of this invention is to provide an improved carrier assembly for lubricating wicks or bodies of the type described above which insures that the applicator surface of the wick moves only perpendicularly of the journal surface but which permits sufficient sidewise movement of the wick to insure good journal contact.

Another important object of the invention is to provide a lubricator unit that permits ready replacement of the wicking assembly, and furthermore, which enables the wick assembly to be mounted on or removed from the carrier assembly quickly and easily in a fool-proof manner by non-technical personnel.

Other objects, uses, and advantages will be obvious or become apparent from a consideration of the following detailed description and the application drawings.

In the drawings:

FIG. 1 is a transverse vertical sectional view of a traction motor support bearing and the axle to which the bearing is applied, showing in elevation a lubricator assembly employing a preferred embodiment of our invention;

FIG. 2 is a sectional view substantially along line 2—2 of FIG. 1;

Figure 3:
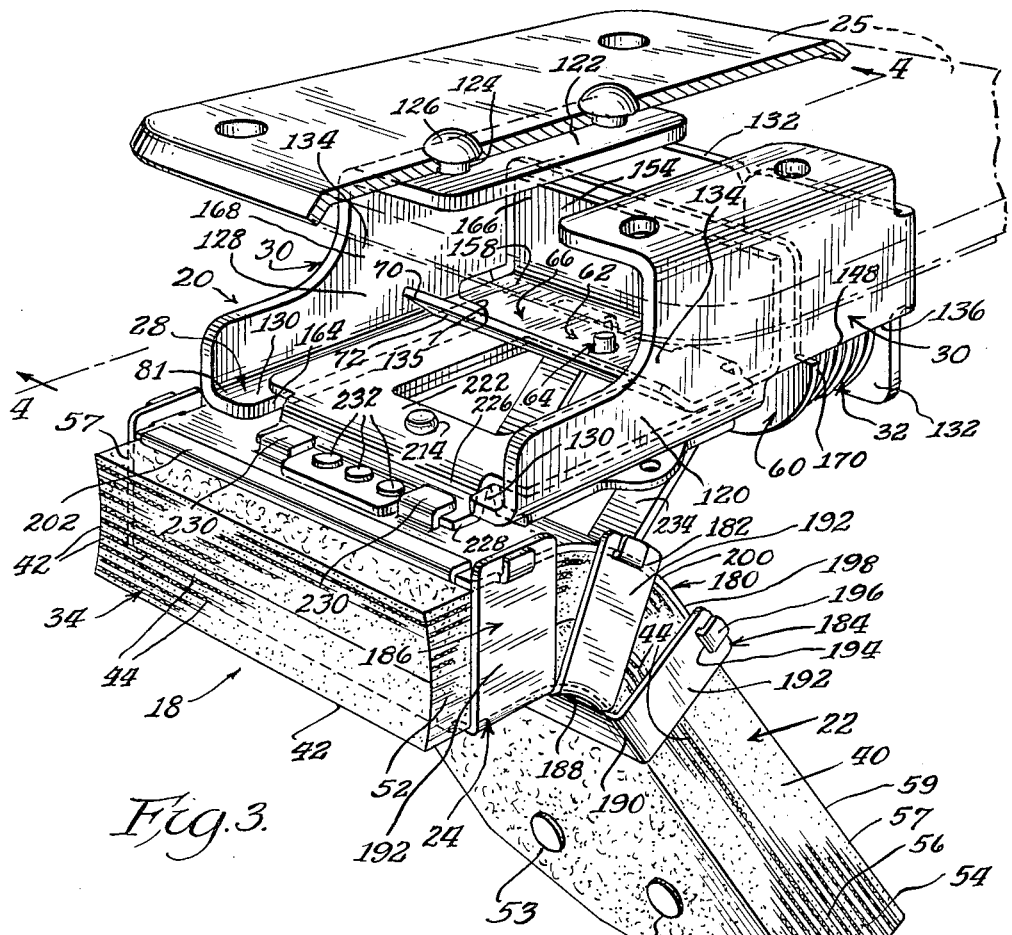
FIG. 3 is a diagrammatic perspective view, partially in section, of the lubricator assembly or unit shown in FIG. 1, looking at the forward end of the lubricator.
Figure 8:
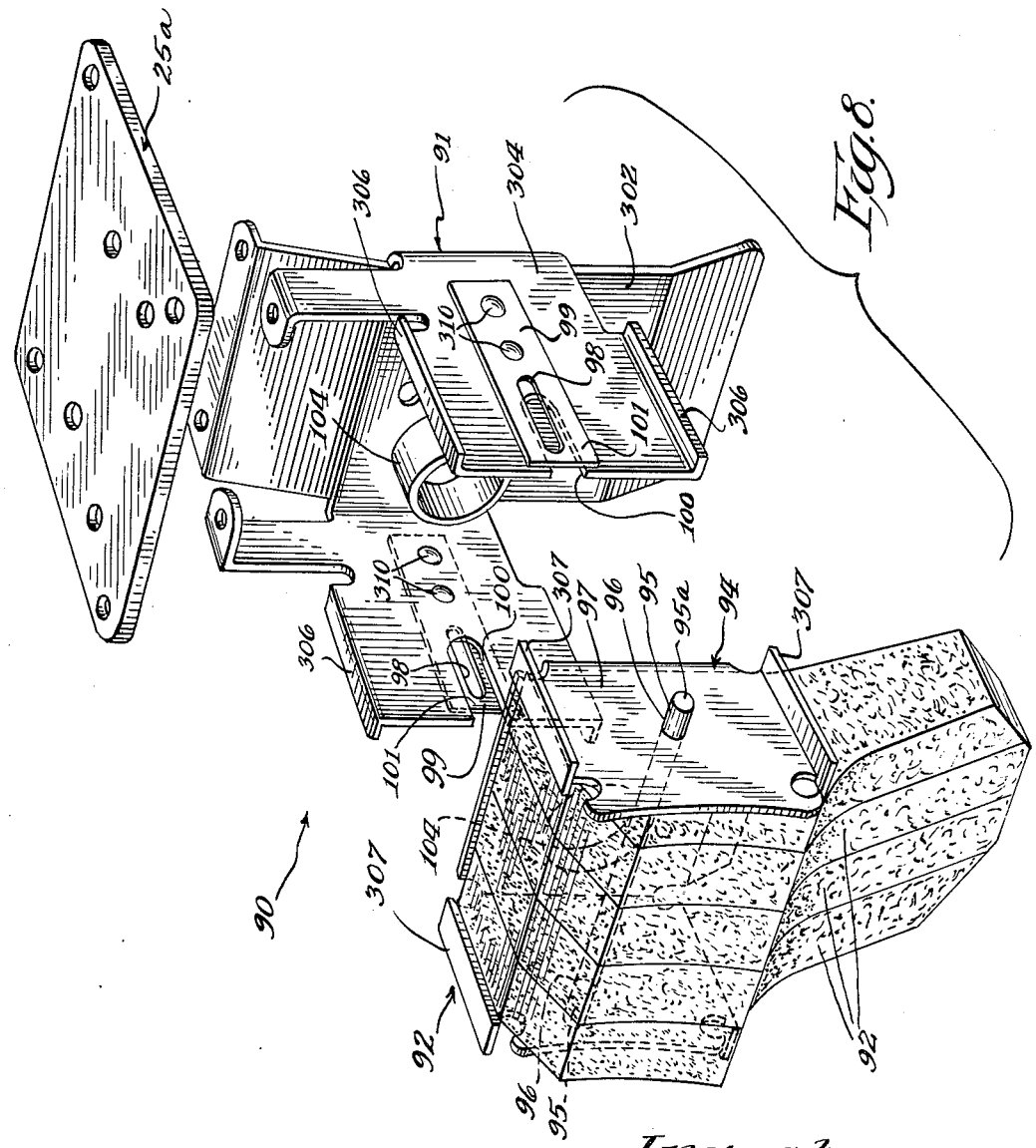

FIG. 5 is a diagrammatic perspective view of the lubricator assembly shown in FIG. 2, but looking from the rear end of the lubricator, and with the wick assembly displaced from the carrier assembly, indicating the movement of the wick assembly that is required with respect to the carrier assembly to apply the wick assembly and remove same from its operative position with respect to the carrier assembly;

FIG. 6 is a rear perspective view of a pusher member that forms an important component part of the lubricator assembly of FIGS. 1–5;

FIG. 7 is a top plan view, partially in section, of the lubricator assembly of FIG. 3, taken substantially along line 7—7 of FIG. 1; and FIG. 8 is a diagrammatic perspective view, partially exploded, illustrating a modified lubricator assembly employing the snap-in feature of this invention.

General description

Referring now to FIG. 1 of the drawings, reference numeral 10 generally indicates a familiar form of traction motor suspension bearing provided with a liner or shell 11 forming the actual bearing for the wheel axle 12. Associated with these parts is a motor suspension bearing cap or axle cap 13 secured to the motor suspension bearing by bolts 14 and provided with an oil reservoir 15.

Our improved lubricator unit or assembly is generally indicated at 16 and is employed to lift oil from the reservoir 15 and apply it to the axle 12 through the window opening 17 in the shell or liner 11.

The lubricating unit or assembly 16 comprises a wick assembly 18 that is suspended from a carrier assembly 20 which is in turn secured to the cover plate 25 of the axle cap. Cover plate 25 is customarily secured in place by appropriate bolts 23, seal 19 being applied between the cover plate and the axle cap.

The wick assembly 18 comprises a lubricating body or wick 22 received in a tubular housing, trough, or holder member 24 that includes a slide member 26 which is mounted on trackways 28 (see FIG. 3) formed by the side support members 30 of the carrier assembly 20. The wick assembly 18 is biased in the direction of the window opening 17 by a pair of compression springs 32 to press the applicator surface 34 of the lubricating body 22 against the axle journal.

The lubricating body or wick 22 comprises a block-like body 40 which initially is of generally right-angled parallelepiped configuration, and may be stamped from a blank of felt sheeting or cut from a roll of felt having the proper width. The block-like body 40 is thus in the form of an elongate or oblong strip of felt material having a rectangular cross-sectional configuration (see FIGS. 3 and 5). Preferably, but not necessarily, the felt material from which the body 40 is formed is of the type employing alternate layers 42 and 44 (see FIG. 2) of felt and woven fabric. The woven fabric 44 is preferably composed of high capillary strands in the form of a plain basket weave, and the felt and fabric layers are pressed together so that the sheeting is a unitary mass held together by the felt fibers felting together through the mesh of the fabric material. However, plain or regular felt will provide a body 40 suitable for the purposes of this invention.

The body 40 after being cut to size is formed at ane end thereof with an arcuate applicator surface 34 in any suitable manner, after which it is applied to the tubular holder member 24 is substantially the position shown in FIGS. 1 and 2, the body 40 being secured in place within the holder by appropriate rivets 50.

The holder member 24 provides the block or body 40 with the bend required to dispose the upper end 52 thereof within the window opening 17 while positioning the lower depending end 54 thereof in the reservoir 15.

It will be noted that the block or body 40 is bent by the holder member 24 so that convex and concave surfaces are formed in the wide sides 55 and 57 of the wick. To facilitate bending of the relatively thick body 40, the body may be slid or bisected as at 56 (see FIG. 3) parallel to the layers 42 and 44 from the end 54 thereof as far as necessary to include the portion of the body that is to be disposed within the arcuate portion of holder 24.

Where the body 40 is slit prior to insertion in its holder, the resulting layers or laminations 55 are secured together by appropriate rivets 53, or by applying an oil resistant adhesive along the slit portion 56 (before the body 40 is applied to the holder 24). Bending of the body 40 will effect a longitudinal displacement of the ends of layers or laminations 59, and these should be trimmed to even up these ends approximately as indicated in FIG. 1.

In accordance with this invention, the wick 22 is biased against the journal by the compression springs 32 acting on a pusher member or plate 60. And a most important aspect of the present invention is that a snap action releasably locking or latching device, generally indicated at 62 in FIGS. 3 and 4, is employed between the wick assembly and the carrier assembly to releasably latch these components together.

Figure 4:
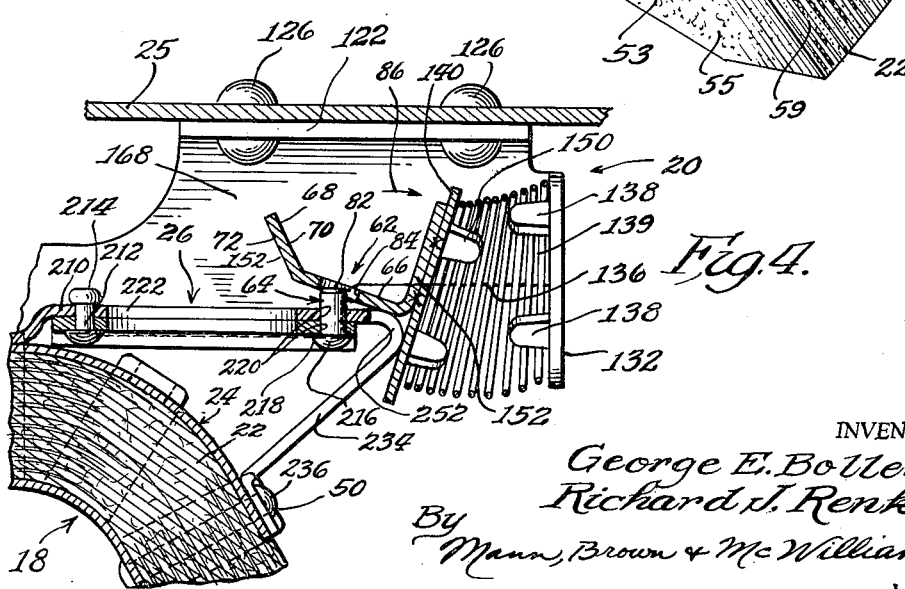
FIG. 4 is a sectional view taken substantially along line 4—4 of FIG. 3, but showing the wick assembly as it is being slid or moved onto the carrier assembly and just before the wick assembly is finally locked in place.

As indicated in FIGS. 3 and 4, the snap action latch device 62 comprises an upstanding pin 64 carried by the wick assembly and a forwardly projecting tongue, arm or shelf 66 carried by pusher member or plate 60 which interlock in the manner suggested by FIGS. 3 and 4 to latch the wick assembly to the carrier assembly. The tongue member or projection 66 at its forward end 68 is provided with an appropriately inclined lip or rim portion 70 that defines a camming surface 72 for cooperation with pin 64 to aid in applying the wick assembly to the carrier assembly.

To apply a wick assembly 18 to a carrier assembly 20 (assuming that the particular carrier assembly 20 has no wick assembly applied thereto), it is merely necessary to align the rear ends 79 of guideways 80 (see FIG. 5) of the wick assembly slide member 26 with the forward ends 81 of carrier assembly trackways 28, and then move the wick assembly to the right of FIG. 5 with respect to the carrier assembly (which under ordinary circumstances will be held by the operator holding axle cap cover 25 to which the carrier assembly 20 is customarily applied when the carrier and wick assemblies are to be placed in operative relation).

As the wick assembly, and in particular its pin 64, is moved towards the pusher member or plate 60, the pin 64 engages cam surface 72 and tilts the pusher member or plate 60 to approximately the position of FIG. 4, in which the top 82 of pin 64 seeks and locates in perforation 84 of the pusher member tongue or shelf 66, whereupon the compression of springs 32 causes the tongue or shelf 66 to seat flush against the slide member 26 to releasably latch the wick assembly to the carrier assembly.

The wick assembly may be readily unlatched from the carrier assembly by the operator using his fingers or an appropriate tool to push the pusher plate member to approximately the position of FIG. 4, and this may be done by engaging the lip or rim portion 70 and tilting the pusher member or plate 60 in the direction of arrow 86 (of FIG. 4) to approximately the position of FIG. 6, whereupon the pin 64 will be released from the locking perforation 84 to permit withdrawal of the wick assembly from the carrier assembly.

In the embodiment of FIG. 8, the principles of this invention are applied to a lubricator unit or assembly 90 employing a somewhat different form of carrier assembly 91 that is affixed to a cover plate 25a, which carrier assembly 91 supports a modified wick assembly 92 in the form of a group of felt bodies 93, having the general configuration disclosed in Harkenrider Patent 2,640,741, mounted in a trough 94. The group of felt bodies is held in place within trough 94 by a pin 95 that passes through aligned openings 96 formed in the side walls 97 of the trough. The wick assembly 94 is applied to the carrier assembly 91 by mounting the ends 95a of pin 95 in slots 98 that are formed in spring clip members 99 that are affixed to the carrier assemblies over side wall slots 100. This may be done by engaging the loose ends 101 of the clips and swinging them outwardly or away from each other to allow the ends of the pin 95 to be inserted in slots 98, after which the spring clip members 99 are permitted to snap back to their positions of FIG. 8.

Suitable compression springs similar to springs 32 are applied between the carrier assembly and the wick assembly over the oppositely directed spring guides 104 to bias the felt bodies against the journal.

The wick assembly 94 may be readily removed from the carrier assembly by merely separating the ends 101 of spring clips 99 as required to permit withdrawal of the wick assembly pin ends 95a from spring clip slots 98.

It will therefore be seen that we have provided several forms of lubricating units which contemplate a fool-proof snap action releasable latching arrangement between the carrier assembly and the wick assembly. In both of the illustrated embodiments of the invention, the latching device is a simplified arrangement that obviously can be readily operated by even the most unskilled personnel.

Furthermore, the embodiment of FIGS. 1–7 provides a simplified narrow wick lubricator arrangement effecting important manufacturing economics as well as providing a lubricating body that is inexpensively manufactured and permits a window opening of substantially reduced size in the bearing 12.

*Specific Description*

The carrier assembly 20 of the embodiment of FIGS. 1–7 generally comprises a pair of spaced support members 30 in the form of hangers or side members 120 each of which includes a pair of laterally and inwardly directed mounting flanges 122 formed with appropriate perforations 124 to receive the rivets 126 that secure the support members 30 to the cover plate 25.

The hanger or side members 120 also are each formed on their respective depending ends 128 with a laterally and inwardly extending flange portion 130 that define the respective trackways 28. The flange portions 130 should have the positioning required to guide the wick assembly 18 along a radii of the journal and in a path that is perpendicular to the surface of the journal.

The respective hanger or side members also each include a rear abutment wall or ear 132 that is disposed substantially at right angles to the side walls 134 of the respective members 30. Referring to FIG. 5, it will be noted that the rear walls or ears 132 are spaced from the rear end 135 of the respective trackways 28, and that in the space separating the rear walls or ears 132 and the rear ends 135 of the trackways, the support members 30 are notched or recessed as at 136 to receive the pusher plate or member 60.

As indicated in FIG. 5, the rear walls or ears 132 are formed to define spaced fingers 138 that are arranged to form abutments or spring seats 139 for the respective compression springs 32, which are thus seated over them to maintain the desired spring cushioning.

The pusher member or plate 60 generally comprises a plate member 140 (see FIG. 6) of inverted T-shaped configuration and defining upstanding sidewalls 142 which merge at right angles into laterally projecting wing portions 144 that define a guiding surface or land 146 that respectively engage with the edge surfaces 148 of the support members 30 when the pusher member 60 is in its operative position.

The plate member 140 is formed with upstanding fingers 150 to form spring seats 151 for the respective springs 32, and the fingers 150 are so oriented with respect to the plate 140 that when the springs 32 are applied to their respective seats, the guiding surfaces or lands 146 will be in substantial contact with the edge surfaces 148 of the carrier assembly support member notched portions 136.

The plate member 140 of the pusher member 60 has affixed thereto an angle shaped member 152 having one of its legs 154 fixed to the plate 140 in any suitable manner, as by spot welding at 156. The other leg 158 of the angle member 152 defines the tongue or projection 66 that has already been described. The leg 158 is appropriately angled as at 160 to define the camming lip 68.

As indicated in FIGS. 3, 5 and 6, the tongue or projection 66 has a dimension between its side edges 162 that exceeds the dimension between the opposing side edge surfaces 164 of the respective trackways 28. The reduced portion 166 of the plate 140 has a dimension between its side walls 142 that is somewhat in excess of the distance between the side edges 162 of the tongue member 66, but which is somewhat less than the distance between the inner surfaces 168 of the supports 30. However, the dimension between the ends 170 of the wing portions 144 should be such that the wing portions extend out under the sidewalls 134 of the respective support members 30, somewhat as indicated in FIG. 7.

Preferably, the spring seats that are defined by the fingers 138 and 150 of the support members and pusher member are so oriented that the central axis of the respective springs 32 will lie along a plane that is just above the upper surface 174 of the tongue member 66 with the result that the forward end of the tongue member will be biased somewhat toward engagement with the respective trackways 28.

The wick holder or trough member 24, comprises a tubular member 180 which is curved to define a curvilinear central portion 182 and rectilinear end portions 184 and 186. The curvilinear portion 180 bends the lubricating body 40 to the configuration desired while the rectilinear portions effect a holding and bracing action on the adjacent portions of the lubricating body.

The tubular member 180 in the form illustrated comprises a bottom or lower member 188 formed along its side edges 190 with spaced upstanding flanges 192, each of which is perforated as at 194 to receive tabs 196 that are respectively affixed to the side edges 198 of a top member 200. The lower member 188 and the top member 200 at their forward ends are each formed with an appendage 202 that are respectively turned back over the respective members for reinforcing purposes.

The slide member 26 generally comprises a top plate 210 and a bottom plate 212 affixed together as by employing rivet 214 and pin 64. Pin 64 in the embodiment illustrated is a rivet having its head 216 in engagement with the undersurface 218 of the lower plate 212 and protrudes upwardly with a force fit through appropriate perforations 220 formed in the two plates 210 and 212, respectively.

The top plate 210 defines a planar top surface 222 with which the tongue member 66 of pusher member 60 engages, and as will be apparent from the showing of FIG. 3, the top plate member 210 includes a downwardly turned appendage 226 of reduced width having its forward end 228 angled for abutting engagement with the top surface of upper member 200 of the wick holder 24. The appendage 226 is received under a pair of tabs 230 that are formed in the wick holder 24 top member 200 and bent over against the angled portion 228 of the appendage 226. Appendage 226 may also be secured to the wick holder as by spot welding at 232.

The top plate 210 of the slide member 26 also includes angled leg portions 234 that are provided with feet 236 which rest on and are secured to the top of the wick holder by the rivets 50 that pass through the wick holder as well as through the wick.

The channels 80 of the slide member are defined by the downwardly turned configuration of the side edges 240 of the lower plate member 212. As shown in FIG. 2, the side edges 240 are in effect off-set downwardly by means of a curved wall 242 to define a level ledge 244 that is generally parallel to the top surface 222 of the top plate 210.

As indicated in FIG. 2, the spacing between the curved walls 242 of the slide member lower plate 212 and the edge surfaces 164 of trackways 28 is such that a limited twisting action of the wick assembly with respect to the carrier assembly is permitted to provide good journal contact in the event of some misalignment between the journal and the carrier assembly.

As already indicated, in the form of the invention of FIGS. 1–7, the pin 64 is in the form of a rivet having its shank extending upwardly sufficiently to form the latching finger or proturberance of the latch device 62.

In use, the lubricator assembly 16 is supplied as a unit together with the cover plate 25, and assuming that the wick assembly 18 is applied to the carrier assembly, the entire unit 250 may be applied to the axle cap merely by securing the cover 25 in place in the usual manner.

When so applied, the applicator surface 34 will engage the journal through the window opening 17, and the wick assembly be urged against the journal by the springs 32 acting on pusher plate or member 60.

In the operating position of the wick assembly, the tongue portion 66 of the pusher member engages and bears against the slide member top plate 210, and the lower front of the pusher plate 140 engages and bears against the slider member legs 234 at their projecting bends 252, which thus serve as bumpers. Thus, the biasing action on the wick assembly is applied to the slide member at leg bends 252 rather than pin 64, and in this connection, the perforation 84 of the pusher member tongue portion 66 is preferably made somewhat larger than the pin 64 so that all of the pressure is transmitted through the slider member legs 234.

Forward movement of the wick assembly toward the journal is limited by engagement of the pusher member wing portions 144 against the rear ends 135 of the trackways. This serves as a stop to prevent the wick holder 24 from engaging the journal when the lubricating body is fully worn. When the wick 22 is new or has just been replaced, the projection of the wick from holder 24 will be such that the pusher member wings 144 will be disposed rearwardly of the trackway rear ends 134 a corresponding amount. Thus, the pusher member or plate 60 gradually moves toward the stop position as the wick wears during use.

Another important aspect is that the dimensioning of the pusher member that has been previously described insures that the pusher member will not interfere with the limited lateral twisting action of the wick assembly with respect to the carrier assembly that is provided for by the disclosed lubricator unit. This limited twisting action is limited when one of the side edges 142 of the pusher member engages with a side of the adjacent support member 30 or bottoms against the compression springs on the rearward side of the unit.

While the pin 64 is shown in the form of a rivet attached to the wick slide member 26, it is immediately apparent that the pin could be applied to the pusher member together with an appropriate mating hole being provided in the slide member.

Furthermore, the snap action latch device herein disclosed may be applied to pivotally mounted wick assemblies, in which case the latching device would include a biased latching member mounted on either the wick or the carrier with a mating or complementary latching device carried by the other member.

While the support members 30 have been shown as individual members, they obviously could be combined to define a single member having the general configuration indicated.

In practice, the wick and carrier assemblies may be made and sold as part of a combined unit, or they may be sold individually. This also applies to the pusher member or plate 60 with regard to the carrier assembly.

Turning now to the embodiment of FIG. 8, the lubricator unit disclosed is substantially the same as that shown in Harkenrider Patent 2,738,242, except that it has been modified in accordance with this invention by the application to the carrier assembly of the spring clips 99.

Thus, the carrier assembly comprises a base 302 provided with spaced side members 304 that receive between them the trough or holder 92. The side members of the base and side wall of the trough are flanged to form interengaging guides 306 and 307 which telescope when the parts are assembled for use, and preferably are proportioned so that the wick assembly 94 will move transversely of the journal along a radii of the journal.

The clip members 99 may be secured in any suitable manner to the side walls 304 of the carrier assembly, as by employing rivets 310.

It will thus be seen that the snap action locking arrangement for the wick assembly of the embodiment of FIG. 8 is similar to that of FIGS. 1–7, except that the ends 101 of the spring members 99 must be spread apart to receive the pin 95 of the felt bodies.

The foregoing description and the drawings are given merely to illustrate and explain our invention and the invention is not to be limited thereto, except insofar as the appended claims are so limited, since those skilled in the art who have our disclosure before them will be able to make modifications and variations therein without departing from the scope of the invention.

We claim:
1. A lubricator device for applying lubricant to a rotatable journal from a lubricant reservoir, said lubricator device comprising:
  (a) lubricator support means defining a supporting trackway that extends transversely of the journal when the lubricator device is mounted in operative relation to the journal,
  (b) a lubricator wick assembly mounted on said trackway for movement toward and away from said journal when the lubricator device is mounted in operative relation to the journal,
  (c) a pusher member mounted on said support means and rearwardly of said wick assembly for movement longitudinally of said trackway,
  (d) abutment means fixed with respect to said support means and positioned rearwardly of said pusher member,
  (e) resilient means operatively interposed between said pusher member and said abutment means for biasing said pusher member toward the journal when the lubricator device is mounted in operative relation to the journal,
  (f) and snap action latching means coacting between said pusher member and said lubricator wick assembly for releasably latching said lubricator wick assembly to said device,
  (g) said pusher member being biased by said resilient means into engagement with said wick assembly for biasing said wick assembly toward the journal when the lubricator device is mounted in operative relation to the journal.

2. A lubricator device for applying lubricant to a rotatable journal from a lubricant reservoir, said lubricator device comprising:
  (a) lubricator support means defining a supporting trackway that extends transversely of the journal when the lubricator device is mounted in operative relation to the journal,
  (b) a lubricator body holder mounted on said trackway for movement toward and away from the journal when the lubricator device is in operative relation to the journal,
  (c) a lubricator body carried by said holder,
  (d) a lubricator body pusher member mounted for movement longitudinally of said trackway and rearwardly of said holder,
  (e) resilient means acting on said pusher member for biasing said pusher member into engagement with said holder member and toward the journal when the lubricator device is mounted in operative relation to the journal,
  (f) and snap acting releasable latch means acting between said holder and said pusher member for releasably securing said holder and said body carried thereby to said pusher member.

3. The lubricator device set forth in claim 2 wherein
  (g) said pusher member comprises a spring seat member that extends transversely of said trackway,
  (h) and wherein said resilient means comprises compression spring means acting on said pusher member.

4. The lubricator device set forth in claim 3 including
  (i) stop means fixed with respect to said trackway and positioned to be engaged by said pusher member for limiting the movement of said lubricator body toward the journal.

5. A lubricator device for applying lubricant to a rotatable journal from a lubricant reservoir, said lubricator device comprising:
  (a) spaced support members each defining a trackway that extends transversely of the journal when the lubricator device is mounted in operative relation to the journal,
  (b) a lubricator body holder mounted on said trackways for movement longitudinally of said trackway and toward and away from the journal when the lubricator device is mounted in operative relation to said holder,
  (c) a lubricator body carried by said holder,
  (d) a pusher member extending transversely of said trackways and positioned between said support members,
    (1) said pusher member comprising a spring seat disposed substantially crosswise of said trackways and mounted for movement longitudinally of said trackways,
    (2) said pusher member including a handle portion projecting toward said lubricator holder when said lubricator device is mounted in operative relation to the journal,
  (e) spring means acting on said pusher member for biasing same toward the journal when said lubricator device is mounted in operative relation to the journal,
  (f) said lubricator holder including a slide portion operably mounted on said trackways for mounting said holder on said trackways for said movement longitudinally of said trackways,
  (g) and snap action releasable latch means elements operably connected with said pusher member and said holder portions for releasably locking said pusher member and said holder together.

6. A lubricator device for applying lubricant to a rotatable journal from a lubricant reservoir, said lubricator device comprising:
(a) a pair of spaced support members each defining a trackway that extends transversely of the journal when the lubricator is mounted in operative relation to the journal,
(b) said trackways each terminating in forward and rearward end portions that are substantially aligned transversely thereof with the forward end portion of the trackways facing the journal when said lubricator device is mounted in operative relation to the journal,
(c) a slide member slidably mounted on said trackways
  (1) said slide member carrying a lubricator body when said device is mounted in operative relation to the journal,
(d) a pusher member extending transversely of the respective trackways and mounted adjacent the rearward end of said trackways for movement longitudinally of said trackways and toward and away from said trackway rearward end portions in the path of movement defined by said trackways,
(e) abutment means fixed with respect to said support members and positioned rearwardly of said pusher member,
(f) spring means operatively interposed between said abutment means and said pusher member for biasing said pusher member toward the journal when said lubricator device is mounted in operative relation to the journal,
(g) said pusher member including a handle portion projecting generally longitudinally of said trackways and in the direction of said trackway forward end portions, and overlying said slide member when said lubricator device is mounted in operative relation to the journal,
(h) and snap action latch means cooperating between said pusher member handle portion and said slide member for releasably securing said slide member to said pusher member.

7. The device set forth in claim 6 wherein
(i) said snap action latch means comprises
  (1) an upstanding pin member carried by said slide member,
  (2) a recess formed in said pusher member handle portion that is proportioned to receive said pin member,
  (3) said handle portion of said pusher member having an angled forward portion that serves to cock said pusher member to receive said pin member on application of said slide member to said trackways.

8. The device set forth in claim 7 wherein
(j) said handle portion of said pusher member is proportioned laterally of said trackways to overlie both said trackways.

9. A lubricator device for applying lubricant to a rotatable journal from a lubricant reservoir, said lubricator device comprising:
(a) a pair of spaced apart hanger members arranged in parallel relation,
(b) said hanger members each defining a ledge portion with said ledge portions substantially opposing each other and each defining a trackway terminating in forward and rearward end portions with the trackway forward end portions facing the journal when said lubricator device is mounted in operative relation to the journal,
(c) said hanger members each including an abutment member spaced rearwardly of the rearward end of the respective trackways and disposed transversely thereof,
(d) a pusher member extending transversely of the respective trackways and mounted between the rearward ends of said trackways and the respective abutment members for movement longitudinally of said trackways and toward and away from said trackway rearward end portions in the path of movement defined by said trackways,
(e) said pusher member comprising a spring seat,
(f) compression spring means operatively interposed between the respective abutment members and said pusher member for biasing said pusher member toward said trackway rearward end portions,
(g) said pusher member including a handle portion projecting generally longitudinally of said trackways and in the direction of said trackway forward end portions,
(h) said pusher member handle portion being proportioned to overlie at least one of said trackways,
(i) with said pusher member handle portion being positioned between the center axis of said compression spring means and said hanger member ledge portions,
(j) a slide member mounted on said trackways and having secured thereto a lubricator body provided with an applicator surface adapted to contact the journal when said lubricator device is mounted in operative relation to the journal,
(k) said slide member including a rearwardly projecting portion,
(l) and releasable snap action latch means cooperating between said pusher member handle portion and said slide member for releasably securing said slide member to said pusher member when said device is mounted in operative relation to the journal,
(m) said pusher member being biased by said compression spring means against said rearwardly projecting portion of said slide member by said compression spring means to bias said body against the journal when said lubricator device is mounted in operative relation to the journal.

10. The device set forth in claim 9 wherein
(n) said snap action latch means comprises
  (1) an upstanding pin member carried by said slide member,
  (2) a recess formed in said pusher member handle portion that is proportioned to receive said pin member,
  (3) said handle portion having an angled forward portion that serves to cock said pusher member to receive said pin member on application of said slide member to said trackways.

11. A carrier for a lubricator device of the type that applies lubricant to a rotatable journal from a lubricant reservoir, said carrier comprising:
(a) a pair of spaced apart hanger members arranged in parallel relation,
(b) said hanger members each defining a ledge portion with said ledge portions substantially opposing each other and each defining a trackway adapted to slidably mount a journal lubricator when said carrier is mounted in operative relation to the journal and terminating in forward and rearward end portions with the forward end portions facing the journal when the carrier is mounted in operative relation to the journal,
(c) said hanger members each including an abutment member spaced from the rearward end of the respective trackways and disposed transversely thereof,
(d) a pusher member extending transversely of the respective trackways and mounted between the rearward ends of said trackways and the respective abutment members for movement longitudinally of said trackways and toward and away from said trackway rearward end portions in the path of movement defined by said trackways,
(e) said pusher member comprising a spring seat, (f) compression spring means operatively interposed between the respective abutment members and said pusher member for biasing said pusher member toward said trackway forward end portions, (g) said pusher member including a handle portion projecting generally longitudinally of said trackways and in the direction of said trackway forward end portions, (h) said pusher member handle portion being proportioned to overlie at least one of said trackways, (i) with said pusher member handle portion being positioned between the central axis of said compression spring means and said hanger member ledge portions, (j) said pusher member handle portion including means for releasably securing same to a journal lubricator when the latter is mounted on said trackways.

12. A carrier for a journal lubricator adapted to carry a lubricating wick, said carrier comprising:

(a) a pair of oppositely formed support members spaced apart from one another, (b) said support members having a side wall and a rear wall, (c) a trackway carried by each of said support members and comprising a ledge portion defined by each of said support members, with said ledge portions extending normally of said support member side walls and projecting toward each other in the same plane, and with the trackways defined by said ledge portions extending from a point adjacent said journal toward said rear wall but terminating short of the latter when the carrier is mounted in operative relation to the journal, (d) a movable pusher plate mounted between said side walls of said support members with said pusher plate having a tongue narrower than the distance between said side walls of said support members but wider than the distance between said trackways, said tongue overhanging said trackways, and with said pusher plate having a back disposed at a substantial angle to said tongue, said back having a top section for insertion between said support member sides, and a lower section of greater width than the distance between said trackways to prevent said pusher plate from being completely inserted between said side walls, and (e) resilient means between said pusher plate back and said rear walls to urge said pusher plate toward said journal when said carrier is mounted in operative relation to the journal.

13. The device set forth in claim 9 wherein:

(n) said lubricator body comprises an elongate lubricator body of capillary material of generally rectangular transverse cross-sectional configuration and wherein said device further includes:

(o) a holder for said body with said holder comprising an arcuate tubular member proportioned to receive said body and curved to define concave and convex surfaces in the wide sides of said body, (p) said body being received in said holder, (q) and means for securing said holder to said slide member with said slide member disposed in tangential relation to the convex side of said holder at the forward end of said slide member, (r) said slide member rearwardly projecting portion comprising leg means projecting rearwardly of said slide member and arched forwardly for securement to said holder, (s) said pusher member engaging said arched portions of said leg means under said biasing action of said compression spring means.

14. In a lubricator device for traction motor suspension bearings wherein an axle cap having an oil reservoir in its lower portion and an access opening above the reservoir that is closed by a cover plate is positioned adjacent a journal to be lubricated, and wherein the cover plate supports a lubricator device for conveying oil from the oil reservoir to the journal, with the lubricator device including support means secured to said cover plate for defining a trackway that extends transversely of the journal and has the forward end of said trackway open and facing the journal when the cover plate is applied to said access opening to close same and position the lubricator in operative relation to the journal, with a lubricator body holder being mounted on said trackway by a slide member secured to the holder and mounted for movement toward and away from the journal when the lubricator device is mounted in operative relation to the journal and carrying a lubricator body proportioned to extend into the oil reservoir when the device is mounted in operative relation to the journal and having an applicator surface positioned to contact the journal when the lubricator device is mounted in operative relation to the journal, with the lubricator body, holder, and slide member being applied to the trackway as a subassembly from the open forward end of the trackway when the cover plate and said support means are detached from the axle cap, and with the lubricator device including resilient means acting on said holder slide member for biasing the lubricator body applicator surface against the journal when the device is mounted in operative relation to the journal, the improvement wherein said lubricator device includes:

(a) a pusher element interposed between said slide member and said resilient means and disposed rearwardly of the trackway with respect to the forward end of the trackway, (b) said pusher element being disposed transversely of said trackway and being mounted for movement longitudinally of said trackway, (c) said pusher element including a projecting member extending forwardly of said trackway and proportioned to overlie the slide member when said slide member is in its operative position on said trackway, (d) said pusher element being mounted for limited tilting movement of said projecting member away from said slide member, (e) one of said members carrying a pin member projecting toward and into the plane of the other of said members, (f) and the other of said members being formed with a recess proportioned and positioned to receive said pin member when said slide member is moved toward said pusher element along said trackway, (g) said pin member and said recess forming a snap action latch device for releasably latching said pusher element to said slide member to mount said subassembly on said trackway for application to the journal.

15. The improvement set forth in claim 14 wherein:

(h) said pin member is carried by said slide member and projects upwardly from the top thereof, (i) said recess is formed in said pusher element projecting member, (j) and wherein said projecting member of said pusher element has an upwardly angled forward portion serving to tilt said pusher element to position said projecting member to receive said pin member when said slide member is moved to cam said pin member against said projecting member forward portion.

16. A carrier for a lubricator device of the type that applies lubricant to a rotatable journal from a lubricant reservoir, said carrier comprising:

a pair of oppositely formed support members spaced apart from one another, a trackway carried by each of said support members and comprising a ledge portion defined by each of said support members, with said ledge portions extending normally of said support members and projecting toward each other in the same plane, and with the trackways defined by said ledge portions disposed to extend transversely of the journal from a point adjacent the journal when the carrier is mounted in operative relation to the journal, a pusher member extending transversely of the respective trackways and mounted between said support members for movement longitudinally of said trackways and toward and away from said point of said trackways, said pusher member comprising a spring seat, resilient means for biasing said pusher member toward said point of said trackways, said pusher member including a shelf portion projecting generally longitudinally of said trackways and disposed adjacent thereto, said pusher member shelf portion being proportioned to overlie said trackways, said pusher member including means for releasably securing said shelf portion thereof to a journal lubricator when the latter is mounted on said trackways and when said shelf portion is disposed adjacent said trackways, and means restraining said pusher member shelf portion from movement upwardly of said trackways.

17. A lubricator device for applying lubricant to a rotatable journal from a lubricant reservoir, said lubricator device comprising:

a pair of spaced support members each defining a trackway that extends transversely of the journal when the lubricator is mounted in operative relation to the journal, said trackways each terminating in forward end portions that are substantially aligned transversely thereof with said forward end portions of the respective trackways facing the journal when said lubricator device is mounted in operative relation to the journal, a slide member slidably mounted on said trackways, said slide member carrying a lubricator body when said device is mounted in operative relation to the journal, a pusher member extending transversely of the respective trackways and mounted between said support members for movement longitudinally of said trackways and toward and away from said trackway forward end portions in the path of movement defined by said trackways, abutment means fixed with respect to said support members, spring means operatively interposed between said abutment means and said pusher member for biasing said pusher member toward the journal when said lubricator device is mounted in operative relation to the journal, said pusher member including a shelf portion projecting generally longitudinally of said trackways and disposed adjacent thereto, said pusher member shelf portion overlying said trackways and said slide member when said lubricator device is mounted in operative relation to the journal, latch means cooperating between said pusher member shelf portion and said slide member for releasably securing said slide member to said pusher member when said shelf portion is disposed adjacent said trackways, and means restraining said pusher member shelf portion from movement upwardly of said trackways.

References Cited by the Examiner

UNITED STATES PATENTS

| | | | |
|---|---|---|---|
| 1,568,396 | 1/26 | Bixby | 308 |
| 2,676,071 | 4/54 | Harkenrider | 308—132 |
| 2,738,242 | 3/56 | Harkenrider | 308—132 |
| 2,980,471 | 4/61 | Harkenrider | 308—132 |
| 2,980,472 | 4/61 | Harkenrider | 308—132 |

DON A. WAITE, *Primary Examiner.*

FRANK SUSKO, ROBERT C. RIORDON, *Examiners.*